United States Patent
Zhang et al.

(10) Patent No.: US 9,531,472 B2
(45) Date of Patent: Dec. 27, 2016

(54) COHERENT WAVEFORM CONVERSION IN OPTICAL NETWORKS

(71) Applicant: Futurewei Technologies, Inc., Plano, TX (US)

(72) Inventors: Zhuhong Zhang, Ottawa (CA); Chuandong Li, Ottawa (CA); Xiao Shen, San Bruno, CA (US); Dominic John Goodwill, Ottawa (JP); Lewei Zhang, Shenzhen (CN); Hongyan Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 304 days.

(21) Appl. No.: 14/270,714

(22) Filed: May 6, 2014

(65) Prior Publication Data

US 2015/0288450 A1    Oct. 8, 2015

Related U.S. Application Data

(60) Provisional application No. 61/819,870, filed on May 6, 2013.

(51) Int. Cl.
| | |
|---|---|
| *H04B 10/00* | (2013.01) |
| *H04J 14/08* | (2006.01) |
| *H04B 10/2507* | (2013.01) |
| *H04B 10/2575* | (2013.01) |
| *H04B 10/29* | (2013.01) |
| *H04B 10/2513* | (2013.01) |

(Continued)

(52) U.S. Cl.
CPC ...... *H04B 10/2507* (2013.01); *H04B 10/2575* (2013.01); *H04B 10/29* (2013.01); *H04B 10/2513* (2013.01); *H04B 10/2569* (2013.01); *H04Q 11/02* (2013.01)

(58) Field of Classification Search
CPC . H04B 10/2507; H04B 10/2575; H04B 10/29; H04B 10/2513; H04B 10/2589; H04Q 11/02
USPC ................................ 398/115, 135, 152, 159
See application file for complete search history.

(56) References Cited

U.S. PATENT DOCUMENTS

| | | | |
|---|---|---|---|
| 4,821,260 A * | 4/1989 | Klank | ...... H04B 1/66 370/345 |
| 7,606,498 B1 | 10/2009 | Wu et al. | |

(Continued)

OTHER PUBLICATIONS

Yi, X., et al., "Modulation-Format-Independent Wavelength Conversion," OFC 2009, PDPC8, 3 pgs.

(Continued)

*Primary Examiner* — Ken N Vanderpuye
*Assistant Examiner* — Abbas H Alagheband
(74) *Attorney, Agent, or Firm* — Conley Rose, P.C.

(57) ABSTRACT

A method for wavelength conversion comprising receiving an input optical signal with a first wavelength, converting the input optical signal to a plurality of input analog signals, generating a plurality of digital signals based on the input analog signals, compensating for waveform distortions by at least filtering one or more of the digital signals to generate one or more compensated digital signals, converting the compensated digital signals to output analog signals via digital-to-analog (DA) conversion, generating an output optical signal with a second wavelength different from the first wavelength based on the output analog signals, and transmitting the output optical signal.

20 Claims, 7 Drawing Sheets

(51) Int. Cl.
  *H04B 10/2569* (2013.01)
  *H04Q 11/02* (2006.01)

(56) References Cited

U.S. PATENT DOCUMENTS

| | | | | |
|---|---|---|---|---|
| 9,025,651 | B1* | 5/2015 | Dave | H04B 10/2569 375/229 |
| 9,025,963 | B2* | 5/2015 | Malouin | H04B 10/6166 398/140 |
| 9,191,120 | B2* | 11/2015 | Zhou | H04B 10/516 |
| 9,236,951 | B2* | 1/2016 | Lowery | H04B 10/697 |
| 2002/0109879 | A1* | 8/2002 | Wing So | H04J 7/00 398/58 |
| 2003/0026524 | A1* | 2/2003 | Kakizaki | G02B 6/3588 385/16 |
| 2003/0179831 | A1* | 9/2003 | Gupta | H03F 1/3247 375/296 |
| 2005/0019036 | A1* | 1/2005 | Soto | H04J 3/1694 398/135 |
| 2005/0099327 | A1* | 5/2005 | Robinson | H03F 3/24 341/143 |
| 2006/0245757 | A1* | 11/2006 | Elahmadi | H04B 10/2513 398/135 |
| 2006/0245758 | A1* | 11/2006 | Elahmadi | H04B 10/2513 398/135 |
| 2009/0052556 | A1* | 2/2009 | Fernandez | H03M 1/662 375/241 |
| 2009/0142064 | A1* | 6/2009 | Taylor | H04B 10/61 398/115 |
| 2009/0201796 | A1* | 8/2009 | Roberts | H04B 10/60 370/210 |
| 2010/0021163 | A1* | 1/2010 | Shieh | H04B 10/60 398/65 |
| 2010/0158521 | A1* | 6/2010 | Doerr | H04B 10/61 398/65 |
| 2010/0196009 | A1* | 8/2010 | Qian | H04B 10/2513 398/65 |
| 2011/0033184 | A1* | 2/2011 | Zhang | H04J 14/002 398/65 |
| 2011/0110660 | A1* | 5/2011 | Taylor | H04J 14/02 398/34 |
| 2011/0123197 | A1* | 5/2011 | Taylor | H04J 14/02 398/79 |
| 2011/0305462 | A1* | 12/2011 | Buelow | H04L 5/0046 398/158 |
| 2012/0008952 | A1* | 1/2012 | Li | H04B 10/50 398/65 |
| 2012/0033965 | A1* | 2/2012 | Zhang | H04B 10/611 398/38 |
| 2012/0128368 | A1* | 5/2012 | Onohara | H04B 10/40 398/135 |
| 2012/0224855 | A1* | 9/2012 | Liu | H04B 10/2543 398/79 |
| 2012/0251111 | A1 | 10/2012 | Xu et al. | |
| 2012/0269510 | A1* | 10/2012 | Hui | H04Q 11/0005 398/50 |
| 2013/0195452 | A1* | 8/2013 | Hui | H04J 14/022 398/50 |
| 2013/0243420 | A1* | 9/2013 | Li | H04B 10/6162 398/25 |
| 2013/0272704 | A1* | 10/2013 | Zamani | H04J 14/06 398/65 |
| 2014/0254644 | A1* | 9/2014 | Gotman | H04L 27/01 375/222 |
| 2014/0307768 | A1* | 10/2014 | Gotman | H04B 1/0475 375/232 |
| 2015/0236795 | A1* | 8/2015 | Malouin | H04B 10/6161 398/65 |
| 2016/0218808 | A1* | 7/2016 | Nishi | G11B 20/10009 |

OTHER PUBLICATIONS

Ip, E.M., et al., "Fiber Impairment Compensation Using Coherent Detection and Digital Signal Processing," Journal of Lightwave Technology, IEEE, Feb. 2010, pp. 502-519.

* cited by examiner

COHERENT WAVEFORM CONVERSION IN OPTICAL NETWORKS

CROSS-REFERENCE TO RELATED APPLICATIONS

The present application claims benefit of U.S. Provisional Patent Application No. 61/819,870 filed May 6, 2013 by Zhuhong Zhang and entitled "Coherent Waveform Conversion in Optical Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical communication systems are widely used today for data communication. Optical communication systems may employ optical fibers as the transmission medium to support high data rates in long distance transmissions (e.g. long haul optical systems). In order to avoid wavelength blocking and to increase dense wavelength-division multiplexing (DWDM) fill, wavelength conversion may be needed at an optical cross connect (OXC) site. Typically, there may be two approaches to realize wavelength conversion: optical-electrical-optical (OEO)-based wavelength conversion and all-optical wavelength conversion.

Existing OEO wavelength conversion approaches may comprise a detector followed by data symbol amplification or regeneration unit, and a transmitter. An optical signal with a first wavelength may first be converted into electrical format. The electric signal may be used to modulate a laser tuned to a destination wavelength to convert to an optical signal. All-optical wavelength conversion may not need to convert an optical signal into electrical format, then to optical format. All-optical wavelength conversion may use nonlinear optical effects in optical components to realize wavelength conversion. These effects may include four wavelength mixing, semiconductor optical amplifier (SOA) saturation, cross-phase modulation (XPM), etc. However, all-optical wavelength converters are relatively new and may not be commercially available yet.

SUMMARY

In one embodiment, the disclosure includes a method for wavelength conversion comprising receiving an input optical signal with a first wavelength, converting the input optical signal to a plurality of input analog signals, generating a plurality of digital signals based on the input analog signals, compensating for waveform distortions by at least filtering one or more of the digital signals to generate one or more compensated digital signals, converting the compensated digital signals to output analog signals via digital-to-analog (DA) conversion, generating an output optical signal with a second wavelength different from the first wavelength based on the output analog signals, and transmitting the output optical signal.

In another embodiment, the disclosure includes an apparatus comprising a receiver configured to receive an input optical signal with a first wavelength, an optical-to-electrical (OE) converter coupled to the receiver and configured to convert the input optical signal to a plurality of input analog signals, an analog-to-digital (AD) converter configured to generate a plurality of digital signals based on the input analog signals, a digital signal processor (DSP) coupled to the AD converter and configured to compensate for waveform distortions caused by the apparatus at least by filtering one or more of the digital signals to generate one or more compensated digital signals, and a DA converter coupled to the DSP and configured to convert the compensated digital signals to output analog signals.

In yet another embodiment, the disclosure includes a wavelength converter comprising a coherent receiver, a digital waveform compensation (DWC) unit, and a coherent transmitter. The coherent receiver is configured to receive an input optical signal at a first wavelength, convert the input optical signal to a plurality of input analog signals via OE conversion, and filter the input analog signals to generate a plurality of filtered input analog signals. The DWC unit is coupled to the coherent receiver and is configured to convert the input analog signals to a plurality of digital signals via AD conversion, compensate for signal distortions introduced in the OEO wavelength converter by filtering the digital signals to generate a plurality of compensated digital signals, and convert the compensated digital signals to a plurality of output analog signals via DA conversion. The coherent transmitter is coupled to the DWC unit and is configured to filter the output analog signals to generate a plurality of filtered output analog signals, convert the filtered output analog signals to an output optical signal with a second wavelength that is different from the first wavelength via electrical-to-optical (EO) conversion, and transmit the output optical signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As optical networks evolve to data rates of 100 gigabits per second (Gb/s) and higher, optical signals may be modulated with polarization multiplexed-quadrature amplitude modulation (PM-QAM) and detected with coherent detection. For coherent optical networks, wavelength conversion may satisfy three aspects: coherence, bandwidth criteria, and power consumption criteria. A DSP may comprise portions or units including dispersion compensation, polarization compensation, and carrier recovery. To recover 100 Gb/s data with an additional digital control circuitry as a clock recovery, existing modem-side DSPs may use a high number of gates (e.g., millions) to be implemented in an application-specific integrated circuit (ASIC) and consumes relatively high power. Therefore, OEO waveform conversion based on loop back of recovered data from receiver to transmitter may not be commercially feasible due to power consumption and size.

Photonic switching may switch optical signals without electrical-to-optical conversion in an optical network. For example, an optical signal may be switched optically instead of being converted into an electronic form and switched in an electronic circuit or packet switch. An all-optical coherent wavelength conversion may be built using an optical hybrid in a coherent transceiver without converting to electrical to copy the waveform and using a nonlinear device to paste it to a destination wavelength. However, this technique, still in early developments, may be implemented on a nonlinear device and may use high power on the probe laser. Other approaches of coherent waveform conversion may include AWC, which may be transparent to modulation format. However, AWC does not have digital compensation capabilities, and AWC may have significant performance degradation from local distortion caused by non-perfect OEO components.

Disclosed herein are embodiments for an OEO wavelength converter that coherently converts and compensates optical waveforms for polarization multiplexed optical signals. In an embodiment, the OEO wavelength converter may receive an input optical signal with a first wavelength and convert the input optical signal to input analog signals via OE conversion. The converter may further filter the input analog signals and convert them to digital signals via AD conversion. The converter may then compensate for signal or waveform distortions caused locally at the converter, such as bandwidth distortions introduced by analog filters or crosstalks between polarizations or phase signals. Compensation may be achieved by filtering the digital signals to generate compensated digital signals, which may then be converted to output analog signals via DA conversion. After EO conversion, an output optical signal with a second wavelength different from the first wavelength may be transmitted. Digital waveform compensating disclosed herein may be relatively simpler compared to existing techniques and may be independent of modulation formats applied on data carried by the input optical signal.

Figure 1:
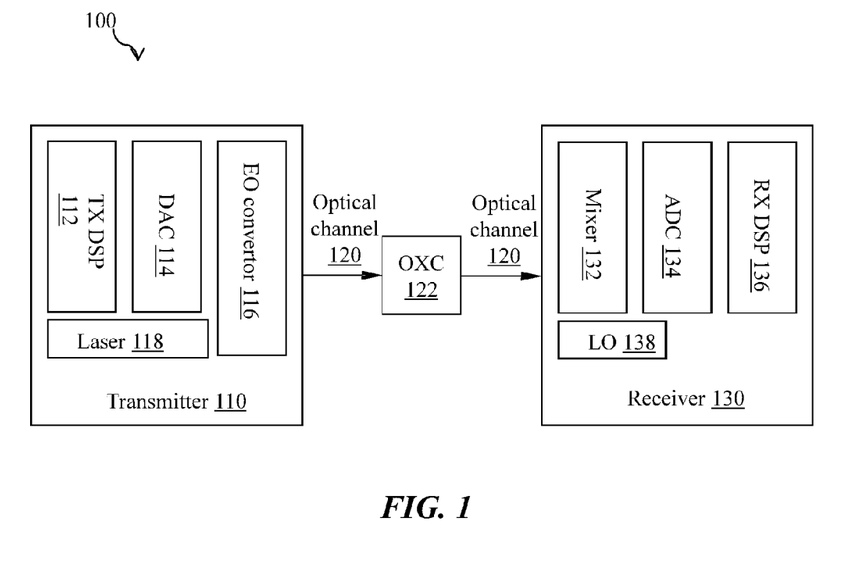
FIG. 1 is a schematic diagram of an embodiment of an optical coherent transportation link.

FIG. 1 illustrates an embodiment of an optical coherent transportation link 100, which may be part of a coherent optical network. The optical coherent transportation link 100 may comprise a transmitter (TX) 110, an optical propagation channel 120, and a coherent receiver (RX) 130 communicatively coupled through an optical propagation channel 120. The transmitter 110 is located on a transmitting side of the optical communication network and may be configured to send optical signals through the optical propagation channel 120 to the receiver 130 located on a receiving side of the optical communication network. Depending on whether data communication is downstream or upstream, the transmitter 110 and the receiver 130 may be located at a central office (CO) side or a customer premise side. For example, in downstream communication, the transmitter 110 may reside at the CO side, while the receiver 130 may reside at the customer premise side. In practice, an apparatus may comprise both transmitter and receiver to facilitate bi-directional data communications. For instance, a customer premise equipment (CPE) may comprise a transmitter (e.g., the transmitter 110) for upstream communication and a receiver (e.g., the receiver 130) for downstream communication, although in such case the transmitter and receiver configuration is different from FIG. 1 because they work in different directions. Further, although an optical network is used as an exemplary, it should be understood that embodiments disclosed herein may be used in other communication systems, such as digital subscriber line (DSL) systems, which may implement discrete multi-tone (DMT) modulation and demodulation.

The transmitter 110 may comprise a DSP 112 (denoted as TX DSP), one or more digital-to-analog convertors (DAC) 114, and an electrical-to-optical (EO) convertor 116, and a laser 118. EO components may modulate electrical signals onto an optical carrier provided by the laser 118. For example, baseband modulated signal may be added by the EO convertor 116 to the optical carrier. An optical signal transmitted by the transmitter 110 may comprise, for example, two orthogonal linear polarization components denoted as X and Y. Each component may comprise two orthogonal phase components, denoted as in-phase (I) and quadric-phase (Q), that may have the same optical carrier frequency. The carrier frequency may be an optical wavelength supplied by the laser 118 with phase noise.

The optical propagation channel 120 may comprise one or more OXC devices (in short as OXC) 122, which may reside at OXC sites for waveform conversion in a coherent optical network. For example, the OXC 122 may convert an input optical signal at a first optical wavelength to an output optical signal at a different optical wavelength. In an embodiment, the OXC 122 implements coherent OEO waveform conversion, and may perform digital compensation for waveform or signal distortions caused by the OXC 122 itself. Compensation may be achieved by filtering and multiple-input and multiple-output (MIMO) processing of digital signals. The OXC 122 may reside anywhere between the transmitter 110 and the receiver 130. Further, the optical propagation channel 120 may comprise optical filters such as cascaded wavelength-selective switches (WSSs), fiber, amplifiers, and other components. The channel 120 may be the sources of chromatic dispersion (CD), nonlinear phase noise, polarization mode dispersion (PMD), polarization dependent loss (PDL), polarization dependent gain, polarization rotation and optical white Gaussian noise.

The coherent receiver 130 may comprise a mixer 132, one or more analog-to-digital converters (ADCs) 134, a DSP unit 136 (denoted as RX DSP), and a local oscillator (LO) 138. The mixer 132 may convert optical signals to electrical signals. In the integrated coherent receiver 130, the LO 138, with a frequency that may be closely matched to the transmitter 110, may mix with a propagated optical signal and split the propagated optical signal into four signals with each split signal being a mixture of transmitted signals. The DSP unit 136 may process signals and recover data.

Figure 2:
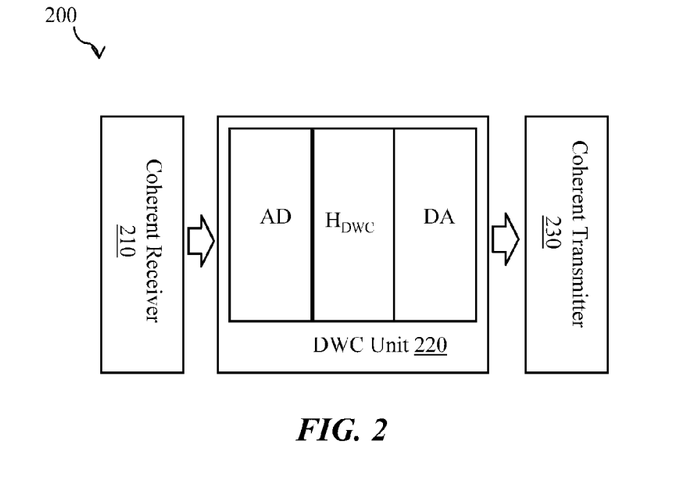
FIG. 2 is a schematic diagram of an embodiment of a coherent OEO wavelength converter.

FIG. 2 illustrates an embodiment of a coherent OEO wavelength converter 200, sometimes referred to as a waveform converter, which may reside at an OXC site (e.g., in the OXC 122). The converter 200 may comprise a coherent receiver 210, digital waveform compensation (DWC) unit or module 220, and a coherent transmitter 230 arranged as shown in FIG. 2. The coherent receiver 210 may be configured to receive an input optical signal at a certain wavelength (the optical signal may have multiple wavelengths), which may be sent from a transmitting side (e.g., the transmitter 110). The coherent receiver 210 may comprise an OE converter configured to convert the optical signal or waveform to a plurality of analog signals expressed via electrical fields.

The DWC module 220 may compensate for local distortions (e.g., bandwidth distortion introduced during electrical filtering) using electronic circuitry. For example, the DWC module 220 may convert input analog signals to digital signals, compensate for any local distortion in the digital domain, and then convert compensated digital signals to output analog signals. The coherent transmitter 230 may comprise an EO converter configured to convert analog signals to an output optical signal. The coherent transmitter 230 may modulate an optical carrier at the same frequency or at a different frequency with the compensated electrical field. Further, the coherent transmitter 230 may transmit the output optical signal to a receiving side (e.g., the receiver 130).

Figure 3:
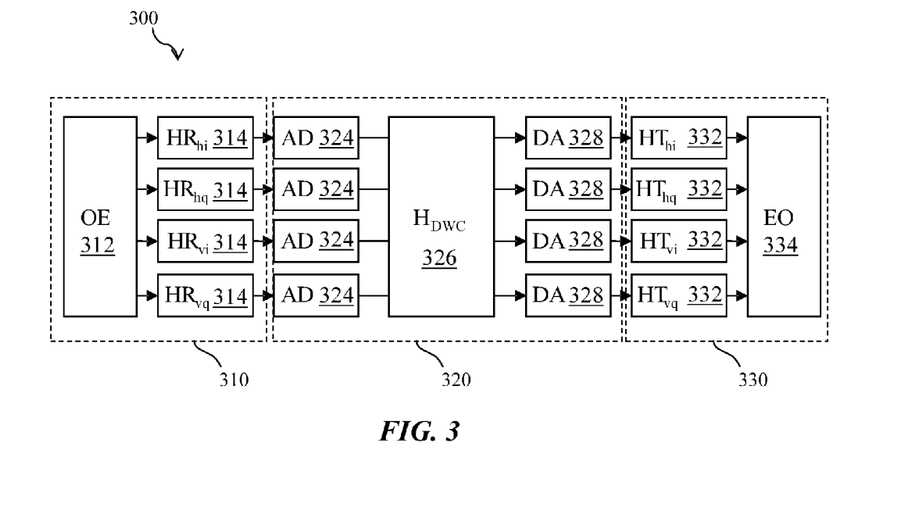
FIG. 3 is a schematic diagram of an embodiment of a wavelength converter shown in greater detail.

FIG. 3 illustrates an embodiment of a wavelength converter 300, which may be the same as or similar to the coherent OEO wavelength converter 200 but is shown in greater detail. The wavelength converter 300 may comprise a coherent receiver 310, a DWC unit 320, and a coherent transmitter 330. An OE converter 312 may be configured to convert an input optical signal to a plurality of input analog signals. The input analog signals may comprise four in-phase (I) and quadrature-phase (Q) signals. The input analog signals may feed into a plurality of input filters 314, each filtering an input analog signal to generate a filtered analog signal. In practice, the filters 314 may be imperfect and defects or distortions may be introduced when generating the filtered analog signals.

A DWC unit 320 may comprise a plurality of AD converters 324, a digital compensation filter 326, and a plurality of DA converters 328 arranged as shown in FIG. 3. Specifically, Each AD converter 324 may convert a filtered analog signal to a digital signal. The digital compensation filter 326 may compensate for any local distortion (sometimes denoted as NOCOL distortions) on digital waveforms. For example, the digital compensation filter 326 may compensate bandwidth of electric circuitry, which may be implemented in a receiver (the coherent receiver 210) and/or a transmitter (the coherent transmitter 230). The digital compensation filter 326 may also compensate for other linear channel effects. Compensation may be performed in either time domain or frequency domain. The digital compensation filter 326 may generate compensated digital signals, which may enter the DA converters 328. Each DA converter 328 may convert compensated digital signals to output analog signals (in other words, convert digital waveforms to an analog electrical field). The output analog signals may further be filtered by a plurality of output filters 332 to become filtered output signals, which may then feed into the EO converter 334. Each branch of input filtering, AD conversion, compensation, DA conversion, and output filtering may correspond to a phase signal.

As shown in FIG. 3, $HR_{hi}$, $HR_{hq}$, $HR_{vi}$, and $HR_{vq}$ may be the transfer functions of the electric circuitry of four branches of the coherent receiver 310, and $HT_{hi}$, $HT_{hq}$, $HT_{vi}$, and $HT_{vq}$ may be the transfer function of the electric circuitry of four branches of the coherent transmitter 330, where HR represents receiver high-pass filtering, HT represents transmitter high-pass filtering, subscripts hi, hq, vi, and vq represent in-phase (I) signal in X-polarization, quadrature-phase (Q) signal in X-polarization, I signal in Y-polarization, and Q signal in Y-polarization, respectively. The $H_{DWC}$ may be transfer functions representing the digital waveform compensation using the digital filter 326. The EO converter 334 may convert multiple electrical signals to an output optical signal modulated on an optical carrier. The output optical signal may have a wavelength that is different from the wavelength of the input optical signal received by the OE converter 312. In a sense, the received waveform at one wavelength may be converted to another wavelength via a "copy" and "paste" process.

Figure 4A:
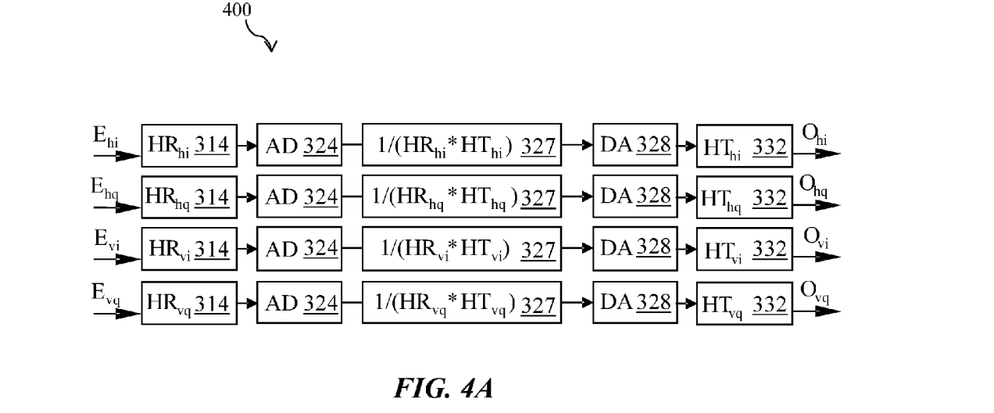
FIG. 4A is a schematic diagram of an embodiment of a digital compensation scheme for compensating four electrical path responses with no substantial crosstalk between phases or polarizations.

FIG. 4A illustrates an embodiment of a digital compensation scheme 400, which may be implemented by a wavelength converter (e.g., the wavelength converter 300) for compensating four electrical path responses with no substantial crosstalk between phases or polarizations. $H_{DWC}$ representing four transfer functions for four phase signals may have digital implementation in either a time domain or a frequency domain. In an embodiment, an input optical signal may be converted via OE conversion to component signals denoted as $E_{hi}$, $E_{hq}$, $E_{vi}$, and $E_{vq}$, each of which represents a polarization multiplexed-signal with accumulated channel distortion and noise. Suppose that, the converted complex signal after output filters are represented by component signals $O_{hi}$, $O_{hq}$, $O_{vi}$, and $O_{vq}$. In an embodiment, using the digital compensation scheme shown in FIG. 4, output filtered analog signals may be expressed concisely as:

$$O_{hi}=E_{hi}*HR_{hi}*(1/(HR_{hi}*HT_{hi}))*HT_{hi}=E_{hi},$$

$$O_{hq}=E_{hi}*HR_{hq}*(1/(HR_{hq}*HT_{hq}))*HT_{hq}=HT_{hq},$$

$$O_{vi}=E_{hi}*HR_{vi}*(1/(HR_{vi}*HT_{vi}))*HT_{vi}=HT_{vi}, \text{ and}$$

$$O_{vq}=E_{hi}*HR_{vq}*(1/(HR_{vq}*HT_{vq}))*HT_{vq}=HT_{vq}.$$

From equations above, it is understood that filtering the digital signals using linear digital filters 327 may compensate for signal distortions introduced during both filtering of the input analog signals and filtering of the output analog signals. A different filter may be used for each phase signal. As a result of digital compensation, signal distortions may become substantially non-existent in the filtered output analog signals. In an embodiment, each input analog signal (e.g., $E_{hi}$) may be filtered using a first filtering function or transfer function in an analog filter (e.g., $HR_{hi}$ in a filter 314). Each corresponding digital signal (e.g., for the same phase as the input analog signal) may be filtered by a second filtering function in a digital filter (e.g., $1/(HR_{hi}*HT_{hi})$ in a filter 327). Each corresponding output analog signal may be filtered by a third filtering function (e.g., $HT_{hi}$ in a filter 332). As shown in FIG. 4A, the second filtering function may be set to about an inverse of a multiplication of the first and third filtering functions such that distortions are substantially removed from the filtered output analog signals.

The equations above are for illustration purposes only, and one of ordinary skill in the art will understand their intentions. Compensation can be performed such that local distortions are removed, and the output signals are substantially the same with the input signals. In the scheme 400, there may be no substantial crosstalk between X-polarization and Y-polarization or between I signals and Q signals therein. Thus, the compensated digital signals may be generated by linear filtering without any MIMO filtering.

Because digital compensation disclosed herein is applied on waveforms instead of data or symbol, compensating for waveform distortions may be independent of one or more modulation formats and/or demodulation formats applied on data carried by the input optical signal. In other words, digital compensation disclosed herein may be transparent to modulation formats used to code digital sub-streams into data symbols. Examples of modulation formats include, but are not limited to binary phase shift keying (BPSK), quadrature phase shift keying (QPSK), 8-level quadrature amplitude modulation (8 QAM), 16 QAM, 32 QAM, 64 QAM, other modulation formats known in the art, and combinations thereof. Each modulation format may have various forms, e.g., with QPSK including polarized multiplexed-QPSK (PM-QPSK). For example, input optical signals carrying data coded using BPSK, QPSK, 8 QAM, and other formats may be compensated in the wavelength converter using exactly the same filters.

Figure 4B:
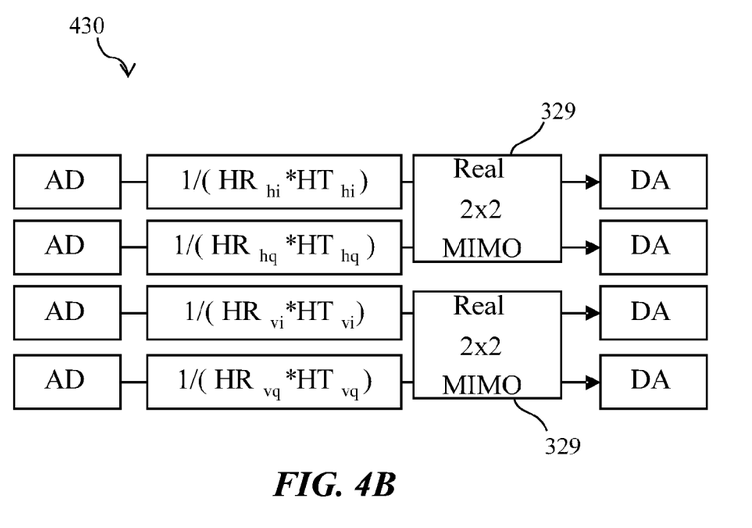
FIG. 4B is a schematic diagram of an embodiment of a digital compensation scheme for compensating phase crosstalks or phase manipulations such as phase conjugation.

FIG. 4B illustrates an embodiment of a digital compensation scheme 430, which may be implemented by a wavelength converter (e.g., the wavelength converter 300) for compensating IQ crosstalk or phase manipulations such as phase conjugation. One of ordinary skill in the art will understand similarities and differences between the digital compensation schemes 430 and 400, thus some implementation details (e.g., value of transfer functions and MIMO coefficients) are omitted in the interest of conciseness. In the scheme 430, there may be crosstalks between an I signal and a Q signal in a same polarization contributing to waveform distortions. Thus, compensated digital signals may be generated based on linear filters 327 and real 2×2 MIMO filtering of the I signal and the Q signal in the same polarization. Two MIMO filters 329 may be applied on X-polarization and Y-polarization, respectively. Since there may be no crosstalk between the X-polarization and Y-polarization, MIMO coefficients may be real numbers instead of complex numbers.

Figure 4C:
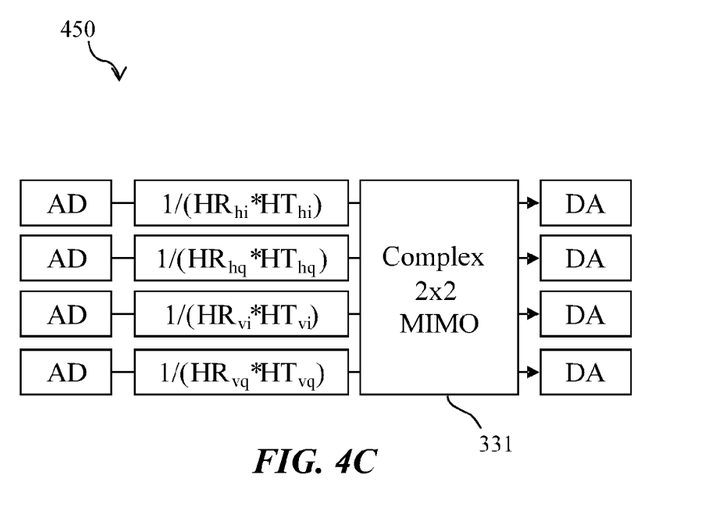
FIG. 4C is a schematic diagram of an embodiment of a digital compensation scheme for compensating crosstalks between two polarizations.

FIG. 4C illustrates an embodiment of a digital compensation scheme 450, which may be implemented by a wavelength converter (e.g., the wavelength converter 300) for compensating crosstalks between two polarizations. One of ordinary skill in the art will understand similarities and differences between the digital compensation schemes 450, 430, and 400, thus some implementation details are omitted in the interest of conciseness. In the scheme 450, there may be crosstalks between X-polarization and Y-polarization and between I signals and Q signals therein contributing to waveform distortions. Thus, compensated digital signals may be generated based on linear filters 327 and complex MIMO filtering of the I signals and Q signals in both the X-polarization and Y-polarization. A complex 2×2 MIMO filter 331 may be applied on both X-polarization and Y-polarization. Since there may be crosstalk between the X-polarization and Y-polarization, MIMO coefficients may be complex numbers.

Figure 5A:
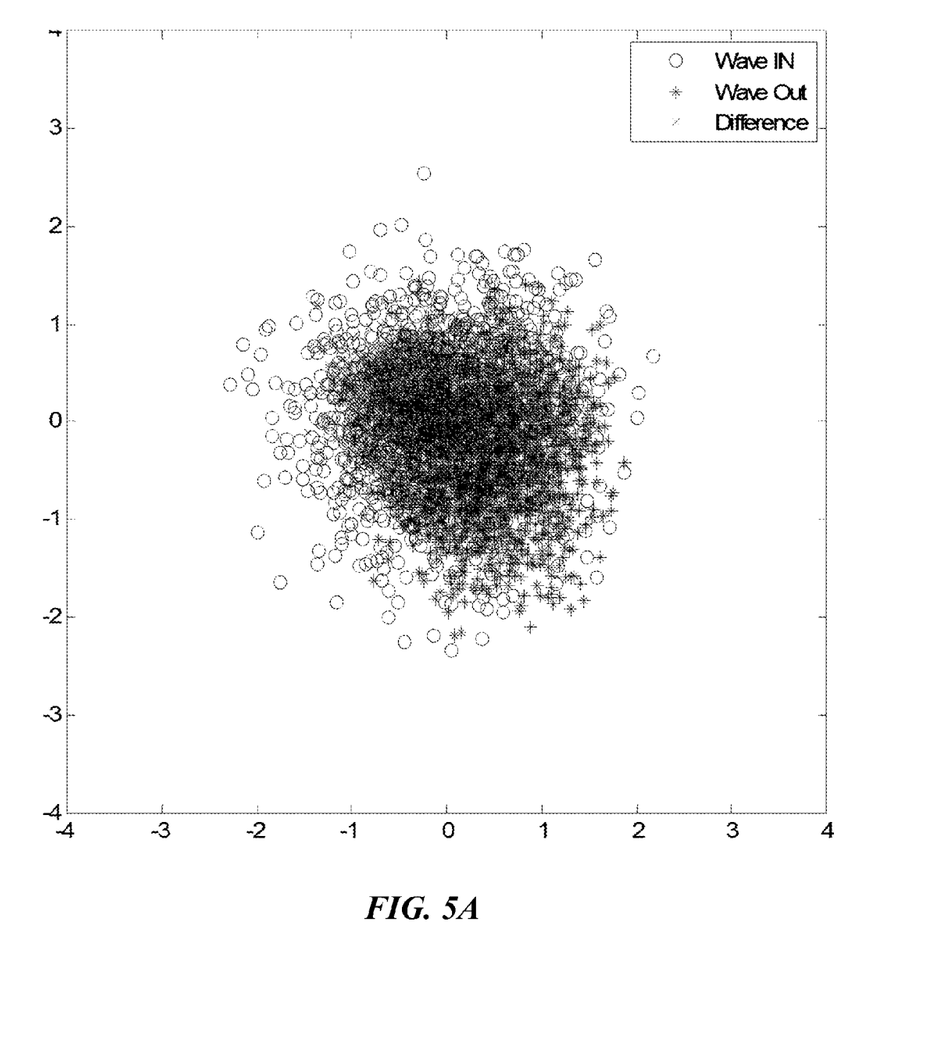
FIG. 5A shows signal degradation caused by a coherent wavelength convertor that uses analog waveform compensation (AWC).
Figure 5B:
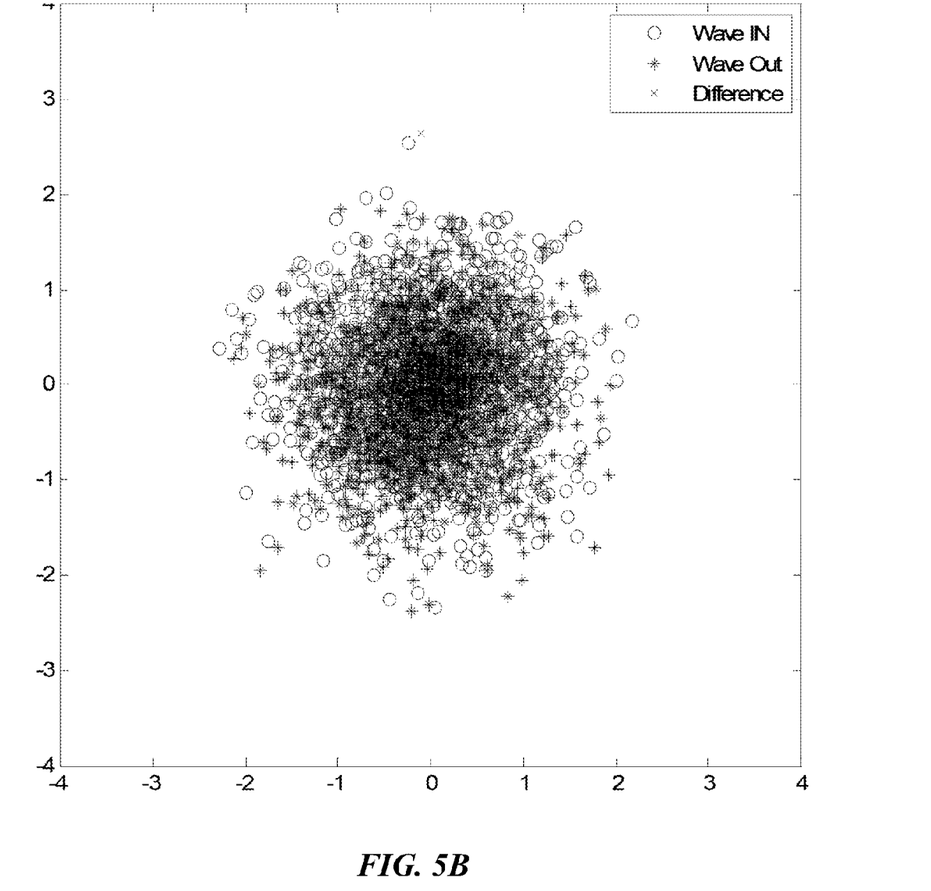
FIG. 5B shows signal degradation caused by a coherent wavelength convertor that uses a DWC embodiment disclosed herein.

FIG. 5A shows signal degradation caused by a coherent wavelength convertor that uses AWC, and FIG. 5B shows signal degradation caused by a coherent wavelength convertor that uses a DWC embodiment disclosed herein. FIGS. 5A and 5B show two IQ plots of signal waveform, where input signals are shown as circles (o), output signals as stars (*), and signal differences between input and output signals as crosses (x). One of ordinary skill will recognize that FIG. 5B using DWC embodiments disclosed herein has a superior performance compared to FIG. 5A, because FIG. 5B shows a smaller difference between each input signal and its corresponding output signal, indicating less error during the waveform conversion process.

Figure 6:
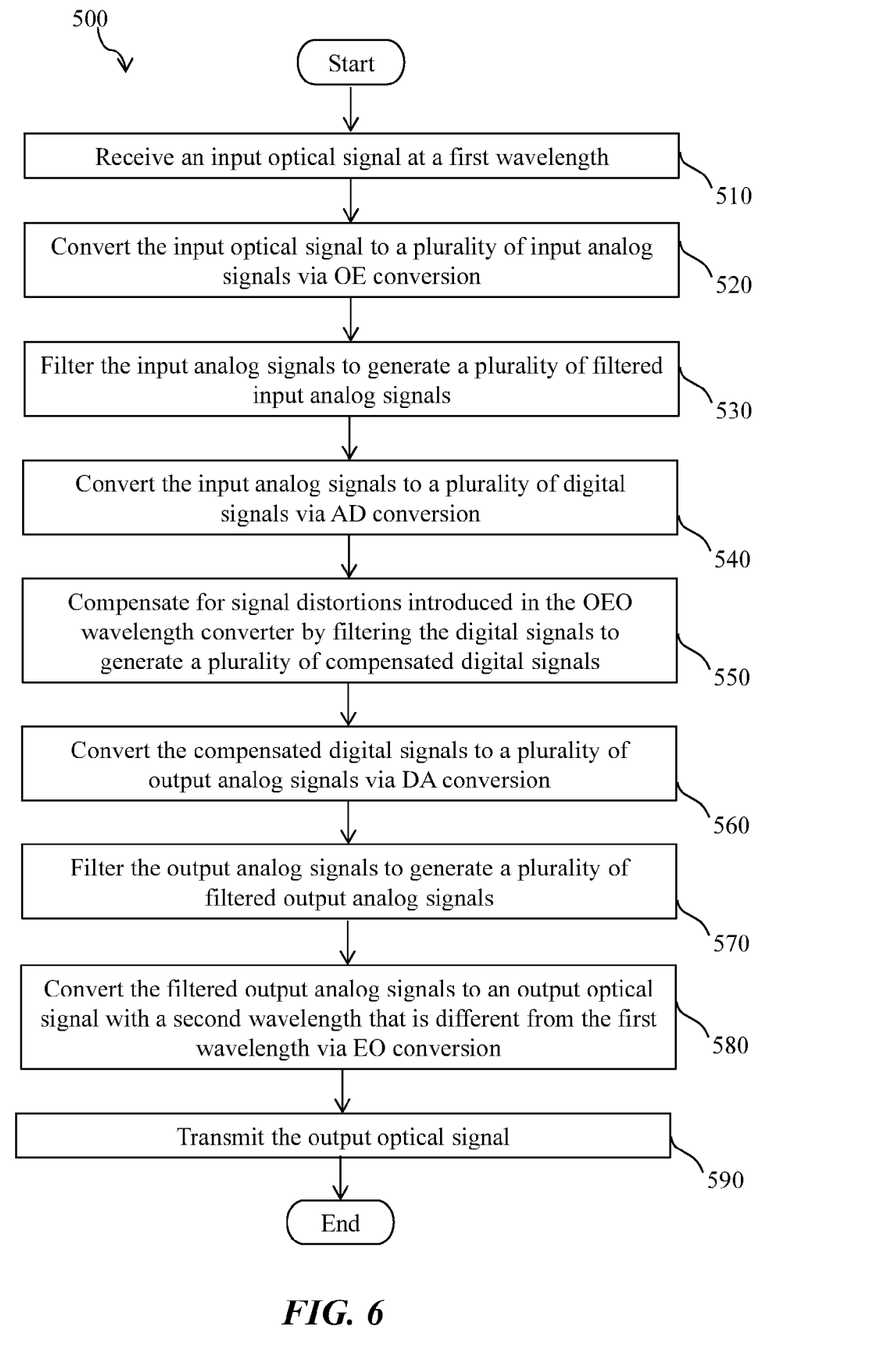
FIG. 6 is a flowchart illustrating an embodiment of a wavelength conversion method.

FIG. 6 is a flowchart illustrating an embodiment of a wavelength conversion method 500, which may be implemented by an OEO wavelength converter (e.g., converter 200) at an OXC site (e.g., in the OXC 122) in an optical communication network. In step 510, the method 500 may receive an input optical signal at a first wavelength. In step 520, the method 500 may convert the input optical signal to a plurality of input analog signals via OE conversion. In step 530, the method 500 may filter the input analog signals to generate a plurality of filtered input analog signals. In step 540, the method 500 may convert the input analog signals to a plurality of digital signals via AD conversion. It should be understood that some steps may be expressed in more general terms. For example, regardless of whether step 530 is implemented, step 540 may be generated stated as generating the digital signals based on the input analog signals, since the term "based on" used in the present disclosure may generally encompass various scenarios including directly/indirectly based on and wholly/partially based on.

In step 550, the method 500 may compensate for local signal distortions introduced in the OEO wavelength converter by filtering the digital signals to generate a plurality of compensated digital signals. In an embodiment, filtering the digital signals may compensate for signal distortions introduced during both filtering of the input analog signals and filtering of output analog signals. Since filtering of the output analog signals may occur after digital compensation, the compensation may be pre-compensation. As a result of digital compensation, signal distortions are substantially non-existent in the filtered output analog signals.

In step 560, the method 500 may convert the compensated digital signals to a plurality of output analog signals via DA conversion. In step 570, the method 500 may filter the output analog signals to generate a plurality of filtered output analog signals. In step 580, the method 500 may convert the filtered output analog signals to an output optical signal with a second wavelength that is different from the first wavelength via EO conversion. In step 590, the method 500 may transmit the output optical signal.

It should be understood that FIG. 6 is for illustration purposes only, thus its steps can be implemented using different embodiments, steps may be modified or skipped, and additional steps may be added wherever necessary. In an embodiment of the method 500, in step 530 each input analog signal may be filtered using a first filtering function or transfer function in an analog filter. In step 550 each corresponding digital signal (e.g., for the same phase as the input analog signal) may be filtered by a second filtering function in a digital filter. In step 570 each corresponding output analog signal may be filtered by a third filtering function. As shown in FIGS. 4A-4C, the second filtering function may be set to about an inverse of a multiplication of the first and third filtering functions such that distortions are substantially removed from the filtered output analog signals.

Figure 7:
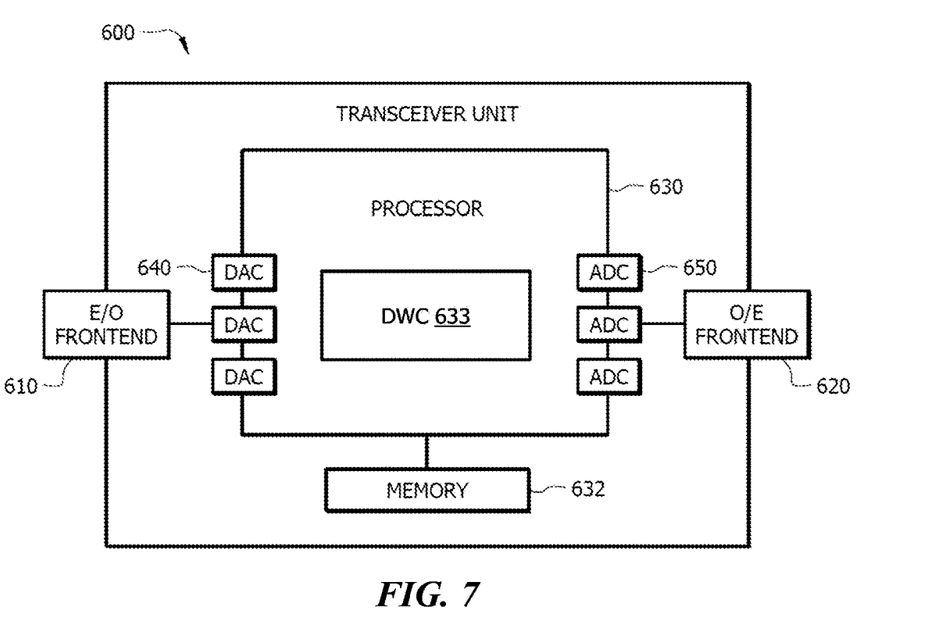
FIG. 7 is a schematic diagram of an embodiment of a transceiver unit.

FIG. 7 is a schematic diagram of an embodiment of a transceiver unit 600, which may be any device that transmits and/or receives optical signals with encoded data. For example, the transceiver unit 600 may comprise or be part of an OEO wavelength converter (e.g., the converter 200 or 300). The transceiver unit 600 may also be configured to implement or support any of the schemes described herein, such as the digital compensation schemes 400, 430, and 450, and the wavelength conversion method 500. In some embodiments transceiver unit 600 may also act as other node(s) in an optical transport network (OTN), such as an optical line terminal (OLT), an optical network unit (ONU), and/or other optical network elements. One skilled in the art will recognize that the term transceiver unit encompasses a broad range of devices of which transceiver unit 600 is merely an example. Transceiver unit 600 is included for purposes of clarity of discussion, but is in no way meant to limit the application of the present disclosure to a particular transceiver unit embodiment or class of transceiver unit embodiments. At least some of the features/methods described in the disclosure may be implemented in a network apparatus or component such as a transceiver unit 600. For instance, the features/methods in the disclosure may be implemented using hardware, firmware, and/or software installed to run on hardware. As shown in FIG. 7, the transceiver unit 600 may comprise an electrical to optical (E/O) frontend 610 and/or an optical to electrical (O/E) frontend 620, which may convert an electrical signal to an optical signal for transmission in an OTN and/or receive an optical signal from the OTN and convert the optical signal to an electrical signal, respectively. A processor 630 may be coupled to the E/O frontend 610 and the O/E frontend 620 via a plurality of DACs 640 and ADCs 650, respectively, which may or may not be part of the processor 630. The DACs 640 may convert digital electrical signals generated by the processor 630 into analog electrical signals that may be fed into the E/O frontend 610. The ADCs 650 may convert analog electrical signals received from the O/E frontend 620 into digital electrical signals that may be processed by the processor 630. If the transceiver unit 600 is at an OXC site, the processor 630 may comprise a DWC unit 633 for compensating local signal distortion, e.g., by filtering digital signals. The processor 630 may be coupled to one or more multi-core processors and/or memory modules 632, which may function as data stores, buffers, etc. The processor 630 may be implemented as a general processor or may be part of one or more ASICs and/or DSPs. In an alternative embodiment, the DWC unit 633 may be implemented as instructions stored in the memory module 632, which may be executed by the processor 630. The memory module 632 may comprise a cache for temporarily storing content, e.g., a Random Access Memory (RAM). Additionally, the memory module 632 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the transceiver unit 600, at least one of the processor 630 and/or memory module 632 are changed, transforming the transceiver unit 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose CPU inside a computer system) in a computer system (e.g., the transmitter 110 or the receiver 130) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for wavelength conversion comprising:
    receiving an input optical signal with a first wavelength;
    converting the input optical signal to a plurality of input analog signals;
    filtering the input analog signals using a first filtering function to generate a plurality of filtered input analog signals;
    generating a plurality of digital signals based on the filtered input analog signals;
    filtering the digital signals using a second filtering function to generate compensated digital signals and to compensate for waveform distortions;
    converting the compensated digital signals to output analog signals via digital-to-analog (DA) conversion;
    filtering the output analog signals using a third filtering function to generate a plurality of filtered output analog signals, wherein the second filtering function performs substantially an inverse of the first filtering function and the third filtering function;
    generating an output optical signal with a second wavelength based on the filtered output analog signals; and
    transmitting the output optical signal.

2. The method of claim 1, wherein the generating the digital signals comprises using analog-to-digital (AD) conversion of the filtered input analog signals, and wherein the filtering the digital signals compensates for waveform distortions introduced during the filtering the input analog signals.

3. The method of claim 2, wherein the generating the output optical signal comprises using electrical-to-optical (EO) conversion of the filtered output analog signals, and wherein the filtering the digital signals further compensates for distortions introduced during the filtering the output analog signals.

4. A method for wavelength conversion comprising:
    receiving a input optical signal with a first wavelength;
    converting the input optic al signal plurality of input analog signals;
    filtering the input analog signals using a first filtering function to generate a plurality of filtered input analog signals;
    generating a plurality of digital signals using analog-to-digital (AD) conversion of the filtered input analog signals;
    compensating for waveform distortions by filtering the digital signals using a second filtering function to generate compensated digital signals and to compensate for distortions introduced during filtering of the input analog signals;
    converting the compensated digital signals to output analog signals via digital-to-analog (DA) conversion;
    filtering the output analog signals using a third filtering function to generate a plurality of filtered output analog signals, wherein the filtering the digital signals further compensates for distortions introduced during the filtering the output analog signals, and wherein the second filtering function is set to about an inverse of a multiplication of the first filtering function and the third filtering function such that distortions are substantially removed from the filtered output analog signals;
    generating an output optical signal with a second wavelength different from the first wavelength using electrical-to-optical (EO) conversion of the filtered output analog signals; and
    transmitting the output optical signal.

5. The method of claim 1, wherein the waveform distortions comprise crosstalks between an in-phase (I) signal and a quadrature (Q) signal in a same polarization, and wherein the filtering the digital signals further comprises using 2×2 multiple-input and multiple-output (MIMO) filtering of the I signal and the Q signal.

6. The method of claim 1, wherein the waveform distortions comprise crosstalks between X-polarization and Y-polarization and between in-phase (I) signals and quadrature (Q) signals therein, and wherein the filtering the digital signals comprises using multiple-input and multiple-output (MIMO) filtering of the I signals and the Q signals in both the X-polarization and Y-polarization.

7. The method of claim 1, wherein no substantial crosstalk exists between X-polarization and Y-polarization or between in-phase (I) signals and quadrature (Q) signals therein, and wherein the filtering the digital signals further comprises using linear filtering without any multiple-input and multiple-output (MIMO) filtering.

8. The method of claim 1, wherein the filtering digital signals is independent of a modulation format of data carried by the input optical signal.

9. An apparatus comprising:
a receiver configured to receive an input optical signal with a first wavelength;
an optical-to-electrical (OE) converter coupled to the receiver and configured to convert the input optical signal to a plurality of input analog signals;
an input analog filter coupled to the OE converter and configured to filter the input analog signals using a first filtering function to generate a plurality of filtered input analog signals;
an analog-to-digital (AD) converter coupled to the input analog filter and configured to generate a plurality of digital signals based on the filtered input analog signals;
a digital signal processor (DSP) coupled to the AD converter and configured to filter the digital signals using a second filtering function to generate compensated digital signals and to compensate for waveform distortions caused by the apparatus; and
a digital-to-analog (DA) converter coupled to the DSP and configured to convert the compensated digital signals to output analog signals; and
an output analog filter coupled to the DA converter and configured to filter the output analog signals using a third filtering function to generate a plurality of filtered output analog signals, wherein the second filtering function performs substantially an inverse of the first filtering function and the third filtering function.

10. The apparatus of claim 9, further comprising:
an electrical-to-optical (EO) converter coupled to the output analog filter and configured to convert the filtered output analog signals to an output optical signal with a second wavelength; and
a transmitter coupled to the EO converter and configured to transmit the output optical signal.

11. The apparatus of claim 10, wherein the filtering the digital signals pre-compensates for distortions caused by the output analog filter when filtering the output analog signals.

12. The apparatus of claim 11, wherein the DSP comprises a digital filter configured to filter the digital signals, and wherein the digital filter performs substantially an inverse of the output analog filter such that the distortions caused by the output analog filter are substantially removed from the filtered output analog signals.

13. The apparatus of claim 9, wherein the filtering the digital signals compensates for distortions caused by the input analog filter when filtering the input analog signals.

14. The apparatus of claim 13, wherein the DSP comprises a digital filter configured to filter the digital signs, and wherein the digital filter performs substantially an inverse of the input analog filter such that the distortions caused by the input analog filter are substantially removed from the filtered input analog signals.

15. The apparatus of claim 9, wherein the waveform distortions comprise crosstalks between an in-phase (I) signal and a quadrature (Q) signal in a same polarization, and wherein the DSP is further configured to further filter the digital signals using 2×2 multiple-input and multiple-output (MIMO) filtering of the I signal and the Q signal.

16. The apparatus of claim 9, wherein the waveform distortions comprise crosstalks between X-polarization and Y-polarization and between in-phase (I) signals and quadrature (Q) signals therein, and wherein the DSP is further configured to further filter the digital signals using complex multiple-input and multiple-output (MIMO) filtering of the I signals and Q signals in both the X-polarization and Y-polarization.

17. The apparatus of claim 9, wherein no substantial crosstalk exists between X-polarization and Y-polarization or between in-phase (I) signals and quadrature (Q) signals therein, and wherein the DSP is further configured to further filter the digital signals using linear filtering without any multiple-input and multiple-output (MIMO) filtering.

18. The apparatus of claim 10, wherein the filtering the digital signals is independent of a modulation format of data carried by the input optical signal, wherein the input optical signal and the output optical signal are polarization-multiplexed optical signals, and wherein the apparatus resides at an optical cross-connect (OXC) site.

19. An optical-electrical-optical (OEO) wavelength converter comprising:
a coherent receiver configured to:
receive an input optical signal at a first wavelength;
convert the input optical signal to a plurality of input analog signals via optical-to-electrical (OE) conversion; and
filter the input analog signals using a first filtering function to generate a plurality of filtered input analog signals;
a digital waveform compensation (DWC) unit coupled to the coherent receiver and configured to:
convert the filtered input analog signals to a plurality of digital signals via analog-to-digital (AD) conversion;
filter the digital signals using a second filtering function to generate a plurality of compensated digital signals and to compensate for signal distortions introduced in the OEO wavelength converter, and
convert the compensated digital signals to a plurality of output analog signals via digital-to-analog (DA) conversion; and
a coherent transmitter coupled to the DWC unit and configured to:
filter the output analog signals using a third filtering function to generate a plurality of filtered output analog signals, wherein the second filtering function performs substantially an inverse of the first filtering function and the third filtering function;
convert the filtered output analog signals to an output optical signal with a second wavelength via electrical-to-optical (EO) conversion; and
transmit the output optical signal.

20. The OEO wavelength converter of claim 19, wherein the filtering the digital signals is independent of a modulation format of data carried by the input optical signal, and wherein the signal distortions are substantially non-existent in the filtered output analog signals.

* * * * *

UNITED STATES PATENT AND TRADEMARK OFFICE
CERTIFICATE OF CORRECTION

PATENT NO. : 9,531,472 B2
APPLICATION NO. : 14/270714
DATED : December 27, 2016
INVENTOR(S) : Zhuhong Zhang et al.

It is certified that error appears in the above-identified patent and that said Letters Patent is hereby corrected as shown below:

On the Title Page

(72) Inventors: Delete "Dominic John Goodwill, Ottawa (JP);" and insert -- Dominic John Goodwill, Ottawa (CA); --

In the Claims

Column 12, Lines 26-56, Claim 4, should read:
4. A method for wavelength conversion comprising:
    receiving an input optical signal with a first wavelength;
    converting the input optical signal to a plurality of input analog signals;
    filtering the input analog signals using a first filtering function to generate a plurality of filtered input analog signals;
    generating a plurality of digital signals using analog-to-digital (AD) conversion of the filtered input analog signals;
    compensating for waveform distortions by filtering the digital signals using a second filtering function to generate compensated digital signals and to compensate for distortions introduced during filtering of the input analog signals;
    converting the compensated digital signals to output analog signals via digital-to-analog (DA) conversion;
    filtering the output analog signals using a third filtering function to generate a plurality of filtered output analog signals, wherein the filtering the digital signals further compensates for distortions introduced during the filtering the output analog signals, and wherein the second filtering function is set to about an inverse of a multiplication of the first filtering function and the third filtering function such that distortions are substantially removed from the filtered output analog signals;
    generating an output optical signal with a second wavelength different from the first wavelength using electrical-to-optical (EO) conversion of the filtered output analog signals; and
        transmitting the output optical signal.

Signed and Sealed this
Twenty-first Day of March, 2017

Michelle K. Lee
*Director of the United States Patent and Trademark Office*

CERTIFICATE OF CORRECTION (continued)
U.S. Pat. No. 9,531,472 B2

Column 13, Lines 9-11, Claim 8, should read:
8. The method of claim 1, wherein the filtering the digital signals is independent of a modulation format of data carried by the input optical signal.